United States Patent Office 3,699,093
Patented Oct. 17, 1972

3,699,093
PROCESS FOR PRODUCING LARGE SURFACE AREA LIGNINS
Mitchell S. Dimitri, Charleston, S.C., assignor to Westvaco Corporation, New York, N.Y.
No Drawing. Continuation-in-part of application Ser. No. 806,684, Mar. 12, 1969. This application Apr. 20, 1971, Ser. No. 135,755
Int. Cl. C07g 1/00
U.S. Cl. 260—124 R                     4 Claims

ABSTRACT OF THE DISCLOSURE

This process is directed to the use of water-immiscible, volatile organic liquids that have a boiling point above 230° F., that are not lignin solvents and form oil-in-water systems to reduce lignin particle contact during drying, thereby reducing coalescence. Such organic liquids contemplated are from the classes of compounds including aromatics, aliphatics and chlorinated hydrocarbons with aliphatic compounds being preferred. This process is useful in making lignins having extremely large surface areas, i.e., above 30 square meters per gram by emulsifying a lignin slurry with a water-immiscible volatile organic liquid having a boiling point above about 230° F., prior to drying.

BACKGROUND OF THE INVENTION

This application is a continuation-in-part of co-pending application, Ser. No. 806,684, filed Mar. 12, 1969 for Process for Producing Large Surface Area Lignins now abandoned.

This invention relates to a process for reducing coalescence during drying by contacting an aqueous slurry of small lignin particles with a water-immiscible, volatile organic liquid having a boiling point about about 230° F. either before or after precipitation and prior to drying. More specifically, the present invention relates to a process for producing lignin particles of extremely high surface area.

The process of this invention is applicable wherever lignin slurries or pastes are to be dried with a minimum of coalescence. Considerable research effort has been made to produce such a lignin. Much of this effort has been expended to produce a lignin capable of replacing carbon black as a reinforcing filler for rubber compositions.

Drying precipitated lignins using the process of this invention produces a lignin particle having an extremely small particle size coupled with an extremely high surface area. These lignins may, of course, be used in any areas applicable to other lignins but produce, in many instances, better results. For instance, the lignins of this invention may be especially useful as drugs for adsorbing acids in the digestive system, due to their extremely high surface area and their acid-alkali resistance. Other suggested uses include carriers for adhesives, catalysts substrates, reinforcement for plastics, and carriers for insecticides and herbicides. The extremely large surface area of these lignin products makes their advantages quite obvious to those skilled in the art.

DESCRIPTION OF THE PRIOR ART

This invention has particular utility in connection with "alkali lignin," namely, that lignin which is produced as a by-product of alkaline pulping using either the soda process, or the sulfate process. During either of these pulping processes the lignin is dissolved in the pulping liquor, which is referred to as "black" liquor, as a salt of lignin and the lignin is conventionally recovered from the pulping liquor by acid precipitation. Methods of recovering lignin from black liquor are well known to those skilled in the art and two of such methods are set forth in U.S. Pats. 3,048,576 and 2,997,466.

Depending on the conditions under which the lignin is precipitated from the black liquor, the precipitated lignin may be either in the form of free acid lignin or a lignin salt. If the lignin is precipitated at a high pH, such as about 9.5 to 10, it is obtained in the form of a salt, while if the lignin is precipitated at a low pH, such as about 2 to 5, or if lignin precipitated at a high pH is acid washed so as to be substantially free of salt, free acid lignin is obtained. A monovalent salt of lignin such as an alkali metal salt, or an ammonium salt of lignin, is soluble in water; whereas, free acid lignin and polyvalent metal salts of lignin are insoluble in water. Precipitated lignin is concentrated to form a cake containing about 50% to 60% water, which may then be dried, commonly spray dried. In addition to spray drying, other expedients are conventionally used, such as drying the lignin in the form of a moist cake distributed on either stationary or moving pans or screens.

While satisfactory lignin products are obtained by using the above-mentioned recovery methods, the surface area of these lignin products does not yield the surface area of particles obtainable by the process of this invention. For instance, the average surface area of lignin particles made by conventional methods is 1 to 5 square meters per gram. In attempting to make a lignin particle possessing a large surface area, U.S. Pat. 3,223,697 discloses lignin particles having a surface area of 18 to 32 square meters per gram. Although these powdered, precipitated lignin particles are of extremely small size and of larger than conventional surface area, even they do not approach the outstanding surface area and characteristics of lignins of this invention.

It is an object of this invention to provide a process for reducing coalescence of small lignin particles during drying. Another object of this invention is to provide a lignin having substantially greater surface area, as compared to conventionally produced lignins. Further objects, features and advantages of this invention are disclosed and illustrated below.

SUMMARY OF THE INVENTION

It has been found that when a lignin slurry containing small particles is vigorously contacted with certain water-immiscible, volatile organic liquids having a boiling point above about 230° F. prior to drying, the forces which cause coalescence during drying are substantially lowered thereby reducing coalescence of the ultra small lignin particles. When an aqueous slurry of these small particles is contacted with the organic liquids of this invention, it has been noted that upon agitation these small particles shift from the aqueous phase to the organic liquid phase or, so called "oil" phase. This transformation occurs even though the particle surface is considered to be lyophilic. This phenomenon apparently induces an "oil" barrier between the small size particle surfaces and the surrounding water during drying.

When aqueous slurries of precipitated lignin are contacted with water-immiscible, volatile organic liquids an emulsion results and the lignin particles adhere to the "oil" droplets to form a thick viscous paste or slurry. The "oil" droplets serve to reduce the forces between the precipitated lignin and the water present and reduce attraction between the lignin precipitate and the aqueous phase during drying. The lignin precipitates dried without using the organic liquids of this invention form a dense, black, frit-like material; whereas emulsion dried lignin precipitates produce a tan, powdery material. The difference in the two lignin products become quite obvious through surface area measurements, wherein the untreated lignin particles have a surface area of 1 to 5 square meters per gram and the emulsion treated products have a much larger surface area, i.e., above 30 square meters per gram. The simple techniques of this invention are of great advantage when compared to those involving spray drying, freeze drying or solvent exchange drying.

DETAILED DESCRIPTION OF THE INVENTION

According to one method of practicing this invention, a lignin solution is adjusted to a solids concentration below 15% lignin. To this solution an acidifying agent is added to lower the pH, causing lignin precipitation and forming a slurry. The precipitated lignin slurry is mixed until homogeneity is obtained whereupon the water-immiscible, volatile organic liquid having a boiling point above about 230° F. is added and mixed until it has been incorporated into the slurry. The resultant slurry is then dried by any conventional means.

According to an alternate method, the water-immiscible, volatile organic liquid is added to the lignin solution before the acidifying agent is added and dispersed to form an emulsion of ultra small droplets. After the precipitation has occurred, the mixing is stopped. Then the water and non-miscible liquid may be separated. The lignin, which is in the water-immiscible liquid layer, if desired, may be separated from the water phase by decantation or other suitable means before drying.

Removal of the water-immiscible liquid by evaporation, or other means which do not exceed the fusion temperature of the lignin, results in extremely high surface area lignin in powdered form.

All soluble lignins which can be precipitated may be treated according to the process of this invention and certain forms of lignin show striking superiority, particularly hexamethylene tetramine modified lignins. The term "lignin" as used herein has reference to alkali lignin and to modified forms thereof, such as those mentioned below or other recovered lignin having equivalent properties and characteristics. The lignins employed in this invention are those lignins which are soluble in water or ammonium hydroxide, but which are insoluble in either the free acid form or in the form of polyvalent salts. In the preferred practice of this invention the lignin solution from which the lignin is precipitated is an aqueous solution of the ammonium salt of lignin. However, any other water-soluble salt of lignin may be employed, particularly the alkali metal salts of lignin. Metal lignates, the polyvalent metal salts of lignin which are water-insoluble and may be employed to precipitate the lignin, may also be used. For example, suitable salts which may be used to precipitate the lignin include, for instance, aluminum sulfate, zinc chloride, magnesium sulfate, ferrous acetate, lead acetate, barium acetate, cadmium chloride, chromium chloride, cobalt chloride, cupric chloride, manganese dichloride, silver nitrate and stannic chloride.

While this invention may be practiced using alkali lignin as it normally occurs, the lignin used may be modified so long as it is soluble and is susceptible to precipitation. Thus the lignin may be subjected to oxidation by passage of air through the lignin solution so that the lignin becomes precipitated in an oxidized condition. Similarly, the lignin may be chemically modified in other respects. However, in any case, the term precipitated lignin has reference to precipitated lignin per se, as well as, to lignin which may be chemically modified, or by the fact that some other substance is precipitated with the lignin. Other lignins include chemically modified lignins such as sulfomethylated lignin and demethylated lignin, especially formaldehyde modified demethylated lignin. Especially successful results have been obtained with hexamethylene tetramine modified demethylated lignin. Lignosulfonates and acid hydrolysis lignins, because of their solubility characteristics, are not suitable, but can be modified by alkali to produce lignin having the necessary characteristics.

The lignin solutions should be kept below 20% solids content, preferably about 15% solids content. Solids content above about 20% create mixing problems because of the high viscosity of the lignin solution.

Any lignin precipitating agent may be employed that may be introduced as an aqueous solution into the aqueous lignin solution. Strong mineral acids other than sulfuric acid may be employed such as hydrochloric or nitric acids. Organic acids also may be employed such as acetic, oxalic and formic acid. Other acid-forming precipitants include carbon dioxide, sulfur dioxide and hydrogen chloride. The function of the acid is that of reducing the pH of the lignin solution to a pH at which the lignin precipitates, and for this reason the choice of the acid employed is largely dictated by considerations of economy. For that purpose of this invention, the pH of any lignin slurry containing small particles should be between 1 and 9, preferably between 2 and 6.

The organic liquids of this invention are the water-immiscible, volatile organic liquids having a boiling point above about 230° F. from the broad classes consisting of aromatics, aliphatics and chlorinated hydrocarbons, with aliphatic compounds being preferred. By way of illustration, suitable aromatic liquids having a boiling point above 230° F. contemplated for use in this invention include, dibenzyl ether, diphenyl, benzene, phenyl bromide, o-cresylic acid, ethyl benzene, toluene and xylene. Suitable organic liquids illustrative of the preferred class of aliphatic compounds include, butanoic acid, hexanoic acid, cyclohexane, dicyclohexyl, turpentine, alpha-pinene, n-nonane, Stoddard solvent, vinyl cyclohexene, kerosene, Varsol and other petroleum-base solvents. Examples of suitable chlorinated hydrocarbons that are water-immiscible, volatile liquids that have a boiling point above about 230° F. include, for example, perchlorethylene, trichlorobenzene, dichloropentane and chlorobenzene.

The water-immiscible, volatile organic liquid is not a lignin solvent, and preferably forms oil-in-water systems. As earlier stated, the organic liquid may be added prior to precipitating the lignin from solution, during precipitation or after precipitation, but in any event prior to drying. The organic liquid to lignin solids ratio may be between from 4:1 to 30:1, with a ratio of 15:1 being preferred.

It is important to the success of this invention that the organic liquid and lignin slurry are homogeneously mixed prior to drying. Particularly successful types of mixers include colloid mill, turbine mixer and high shear mixer, with the colloid mill being preferred.

If separation of the precipitant from the residual liquid is desired, such separation may be accomplished in any suitable way, such as filtration or by using a centrifugal separator. It is, however, not necessary to separate the "oil" phase from the "aqueous" phase before drying. Drying is, nevertheless, facilitated by a separation of the phases.

After homogenously mixing the water-immiscible, volatile organic fluid and the precipitated lignin slurry, the thus-formed emulsion is dried at a temperature between 70° F. and 500° F., preferably at a temperature of about 230° F.

In addition to the water-immiscible, volatile organic liquids, various emulsifiers and surfactants may be added to the slurry to aid in achieving a homogeneous emulsion. One particularly successful class of surfactants includes surfactants based on alkylaryl polyether alcohols, sulfonates and sulfates, sold under the trade name "Triton."

The typical lignin product of this invention is a porous, agglomerated, solid powder, resembling popcorn, and consisting of clusters of particles tightly bound at their points of contact. Crevices and capillaries abound, greatly increasing the surface area of the material. While the powder product may be dry, the particles of powder may occur in discrete powder form when moist or even when suspended in an aqueous medium. Assuming that the particles are all spherical, then ultimate particles of approximately 300 angstroms are indicated in a material with a surface area of 150 square meters per gram.

The lignins precipitated and dried without the water-immiscible, volatile organic liquids of this invention, have surface areas that seldom exceed 5 square meters per gram; whereas with the emulsification treatment of this invention the average surface area of lignin particles is well above 30 square meters per gram. The surface area of the lignins was determined by the Brunauer-Emmet-Teller (BET) method using nitrogen adsorption, and whenever the term "surface area" is referred to, it is the surface area as determined by the BET method.

The following examples illustrate the process of this invention.

Example 1

A lignin solution was prepared by dissolving 1000 grams of free acid alkali lignin in 5410 grams of water containing 170 grams of ammonia. Of this solution 500 grams were diluted with 100 grams of water and the diluted solution was precipitated with a solution of 50 ml. of glacial acetic acid in 500 grams of water while being agitated with a Model L–1, Gifford-Wood Homomixer. Agitation was continued for 30 seconds after the addition of the acidifying solution. The pH of the precipitated slurry was 5.1. The precipitated slurry was transferred to a PV–6 Eppenach Colloid Mill and 100 grams of Varsol was quickly added. The mixture became emulsified upon agitation, which was continued for 3 minutes. The emulsified mixture formed a paste and was removed from the colloid mill, placed in shallow stainless steel drying pans and dried in a forced convection oven for 8 hours at 230° F. The product was a light tan, powdery lignin material with a surface area of 81.8 m.$^2$/g.

Example 2

Using the same lignin solution prepared for use in Example 1, 500 grams were mixed with 1000 grams of water with a Model L–1 Homomixer for 1 minute. Then 19.5 grams of zinc acetate dissolved in 250 grams of water were added to precipitate the lignin and agitation continued for another minute. The pH of the zinc lignate was 9.5. Then 500 grams of Varsol was added and agitation continued for an additional 2 minutes. The entire mixture was further mixed for 1 minute in an Eppenbach PV–6 Colloid Mill. The paste was then dried at 230° F. for 8 hours to produce a porous, tan solid. The surface area of the lignate was 75.2 m$^2$./g.

Example 3

To illustrate the effect of contacting a lignin solution with an organic liquid of this invention before precipitating the lignin, a hexamethylene tetramine modified lignin solution was prepared by reacting 1 mole of hexamethylene tetramine and 10 moles of ammonia with 1 mole of free acid alkali lignin. From this solution, 230 grams, containing 50 grams of lignin were diluted to 1000 grams with water and mixed in a colloid mill for 1 minute. Then 750 grams of Varsol were added and the mixture agitated for 1 minute to form an oil-in-water emulsion. A solution of 30 mls. of acetic acid in 500 mls. of water was then added to the emulsion in the colloid mill and after agitation for an additional minute the pH was 5.1. The resultant paste was dried at 230° F. for 8 hours. The surface area of this tan, powdery lignin was 157 m.$^2$/g.

Example 4

To illustrate the use of an aromatic liquid of this invention, a lignin slurry was prepared by precipitating an ammonium lignate solution with sulfurous acid to a pH of 3.0 and a water:lignin ratio was maintained at 75:1. After precipitation the slurry was mixed with xylene, which has a boiling point of 280° F., in a high shear mixer which converted the mixture into a paste at a xylene:lignin ratio of 15:1. The paste was dried in a forced air convection oven at 185° F. Surface area was found to be 58.2 m.$^2$/g.

Example 5

To show the use of a chlorinated hydrocaron of this invention, a solution of hexamethylene tetramine modified lignin was contacted with a solution of sulfurous acid to precipitate the lignin. The precipitated lignin slurry was emulsified with 30 parts of perchlorethylene having a boiling point of 250° F., per part of lignin in a high shear mixer. The resultant paste was then dried in a forced air convection oven. The surface area was found to be above 30 m.$^2$/g.

Example 6

An ammonium lignate solution, 500 grams, was diluted with 1000 grams of water and the lignin is precipitated with a 25% solution of magnesium acetate. Varsol, 1000 grams was added to the slurry in a colloid mill and a viscous paste was formed. This paste was dried at 230° F. in a forced air convection oven. The surface area of the powder was found to be 31.8 m.$^2$/g.

Example 7

The above procedure was repeated substituting a 10% calcium acetate solution for the magnesium acetate. The product was a powder with a surface area of 21.6 m.$^2$/g.

Example 8

To illustrate the use of additional water-immiscible, volatile organic liquids having a boiling point above about 230° F. representative of this invention, a lignin solution of acid free alkali lignin was prepared and precipitated according to the procedure set forth in Example 1. To the precipitated slurry, the organic liquids set forth in the table below were added. The mixture was emulsified and the resulting paste dried in a forced air convection oven.

| Organic liquid: | Resultant dried product |
| --- | --- |
| Turpentine | Light tan, fluffy powder. |
| Kerosine | Tan, porous product. |
| Chlorobenzene | Light tan, fluffy powder. |
| Alpha-pinene | Do. |

Example 9

As a comparison with the large surface area products of the examples set forth above, lignin solution was prepared containing 100 grams of an acid free alkali lignin in 5400 grams of water with 170 grams of ammonia. The lignin solution was precipitated with acetic acid to a pH of 5.0 and the slurry was then dried for 8 hours at 230° F. The resulting lignin which was produced without the emulsion treatment of this invention was a dense, black, glassy solid having a surface area of 0.8 m.$^2$/g.

While this invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

I claim:

1. A process for decreasing coalescence of alkali lignin particles during drying which comprises, emulsifying an aqueous slurry containing a precipitated alkali lignin and a water-immiscible, volatile organic liquid having a boiling point above about 230° F. being selected from the group consistng essentially of aromatic, aliphatic and chlorinated hydrocarbon, and drying said emulsion.

2. The process of claim 1 wherein said alkali lignin is a lignin selected from the group consisting essentially of metal lignates, formaldehyde modified lignins, demethylated lignins and hexamethylene tetramine modified lignins.

3. The process of claim 1 wherein said organic fluid is from the group consisting essentially of perchloroethylene, xylene and Varsol.

4. The process of preparing an alkali lignin having a large surface area which comprises, acidifying an aqueous alkali lignin solution to precipitate said lignin, contacting said precipitated lignin with an organic liquid from the group consistng essentially of perchloroethylene, xylene and Varsol, emulsifying said precipitated lignin and organic liquid, and drying said emulsion.

References Cited
UNITED STATES PATENTS
3,223,697   12/1965   Ball et al. _____ 260—124

LEWIS GOTTS, Primary Examiner

D. R. PHILLIPS, Assistant Examiner